July 28, 1970  K. A. RAYPHOLTZ  3,521,774

LOADING APPARATUS FOR VEHICLES

Filed July 10, 1968  3 Sheets-Sheet 1

INVENTOR
KENNETH A. RAYPHOLTZ
BY
Woodard, Weikart, Emhardt & Naughton
ATTORNEYS

July 28, 1970          K. A. RAYPHOLTZ          3,521,774

LOADING APPARATUS FOR VEHICLES

Filed July 10, 1968          3 Sheets-Sheet 2

INVENTOR
KENNETH A. RAYPHOLTZ
BY
Woodard, Weikart, Emhardt & Naughton
ATTORNEYS

INVENTOR
KENNETH A. RAYPHOLTZ

United States Patent Office 3,521,774
Patented July 28, 1970

3,521,774
LOADING APPARATUS FOR VEHICLES
Kenneth A. Raypholtz, Marion, Ind.
(W. Sycamore St., Silver Lake, Ind. 46982)
Filed July 10, 1968, Ser. No. 743,885
Int. Cl. B60r 9/08
U.S. Cl. 214—450       4 Claims

ABSTRACT OF THE DISCLOSURE

Apparatus for loading onto and unloading from vehicles, objects such as boats, utilizing a channel-track, a carriage traveling on wheels in the track, a cable and winch for lifting and lowering the object, and means for securing the object in position on top of the vehicle.

BACKGROUND OF THE INVENTION

Field of the invention

This invention relates to apparatus for loading objects onto a vehicle and for unloading objects from a vehicle. The invention is particularly adaptable to the loading and unloading of objects such as boats onto or from a recreational vehicle, such as a truck camper or a trailer.

It is relatively common to see automobiles, trucks and other vehicles towing or carrying all sorts of objects. Special trailers have been devised to permit the towing of various objects behind vehicles, and special rigs have been devised to permit objects to be carried on top of vehicles. When an object such as a boat is to be transported on top of a private recreational vehicle, one problem which often becomes painfully apparent is that of loading and unloading the boat. Even where the rig which holds the boat is relatively easy to attach or is built on, and even in those situations where it is relatively simple to secure the boat to the rig, getting the boat on and off of the rig may still be extremely difficult. This problem may be particularly acute in the absence of an abundance of tall, strong men.

This invention provides apparatus which permits a relatively heavy and awkward object, such as a boat, to be readily loaded onto the top of a vehicle by one person. Moreover, an individual can readily load and unload a vehicle without exercising great physical strength, skill and agility. This is all accomplished with inexpensive apparatus of a durable and non-complex nature.

Description of the prior art

Portable conveyors for loading objects onto trucks are known (e.g., U.S. Pat. 3,319,775), as are means for pulling boats secured to wheel assemblies into trailers (e.g., U.S. Pat. 3,193,321). Means for accommodating and securing boats on the top of vehicles are known, and rollers over which the boat passes have been used to aid in putting the boat in position on top of the vehicle (see e.g., U.S. Pats. 2,817,852 and 2,822,213). However, those who have previously attempted to improve the means of loading and carrying boats on vehicles have failed to fully appreciate or solve all of the problems solved by this invention.

SUMMARY OF THE INVENTION

In one form, the apparatus of this invention includes a channel-type track attached to the vehicle and extending from adjacent the bottom of the vehicle onto its top, a carriage assembly having wheels which are received in and movable in the track channel, means for securing the boat or other object to the carriage assembly, a cable having a free end which is attachable to the boat or other object, and lifting means such as a power winch or pulley assembly attached to the vehicle and in cooperative association with the cable for moving the boat or other object and the carriage assembly to which it is secured along the full extent of the track.

BRIEF DESCRIPTION OF THE DRAWINGS

The invention will be understood from the following description of a preferred embodiment thereof and the drawings, in which.

DESCRIPTION OF THE PREFERRED EMBODIMENT

Figure 1:
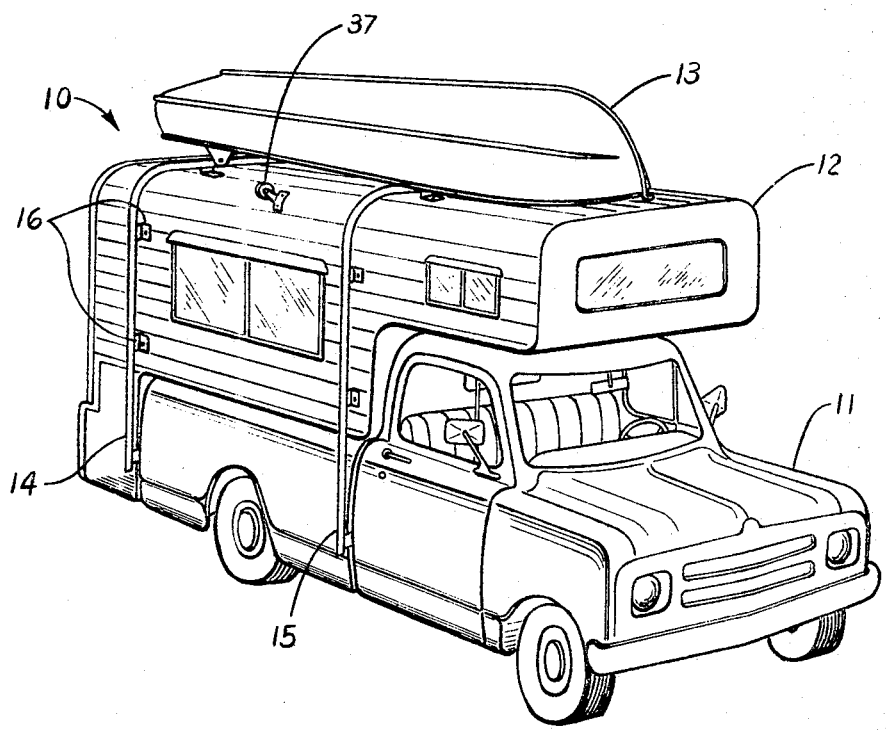
FIG. 1 is a perspective view of a pick-up truck and camper with a boat in position on top of the camper.

FIG. 1 illustrates a pick-up truck and camper, designated generally as 10. A pick-up truck 11 and a recreational camper 12 are affixed to one another in a conventional manner. A boat 13 is shown secured in a fixed position atop the camper 12. Channel-type tracks 14 and 15 for use in loading and unloading the boat 13 are secured to and spaced from one side and the top of camper 12 by spacers 16. Spacers 16 may be adjusted to vary the distance between the tracks and the top and side of the camper and truck.

Figure 2:
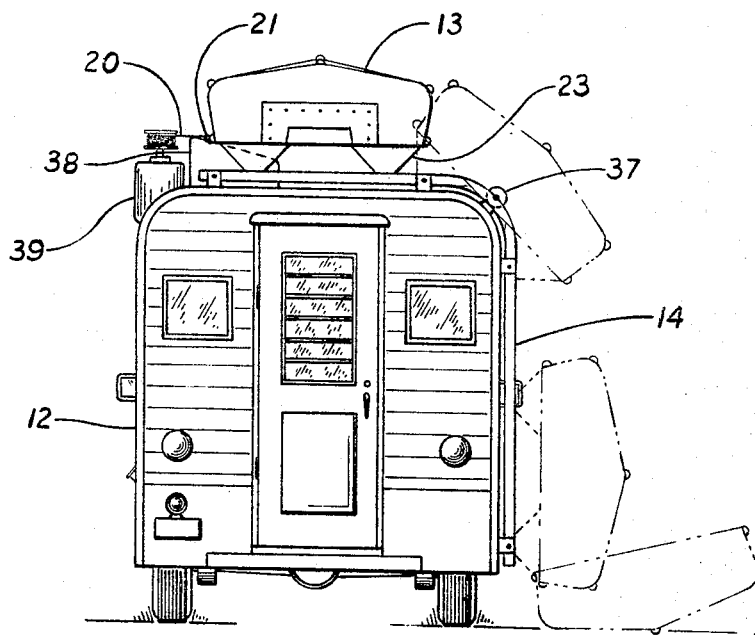
FIG. 2 is a rear view of the camper with a boat on its top, and illustrates with broken lines various positions of the boat in traveling from its initial position on the ground to its final position on top of the camper.

As best seen in FIG. 2, track 14 extends from adjacent the bottom of camper 12 up one side and is curved around the top of the camper and extends substantially across the top. Track 15 is identical to track 14. Lifting means, such as the power winch 19, is attached to the top of camper 12 adjacent the side of the camper opposite to the side accommodating tracks 14 and 15. A cable 20 extends from winch 19 to boat 13 and is attached to boat 13 as indicated at 21. Other means, such as a rope or suitable wire could be used in place of cable 20. The cable 20 may be attached to boat 13 in any convenient manner, such as by engaging an S-hook positioned in a hole in the side of the boat near its longitudinal center.

Figure 4:
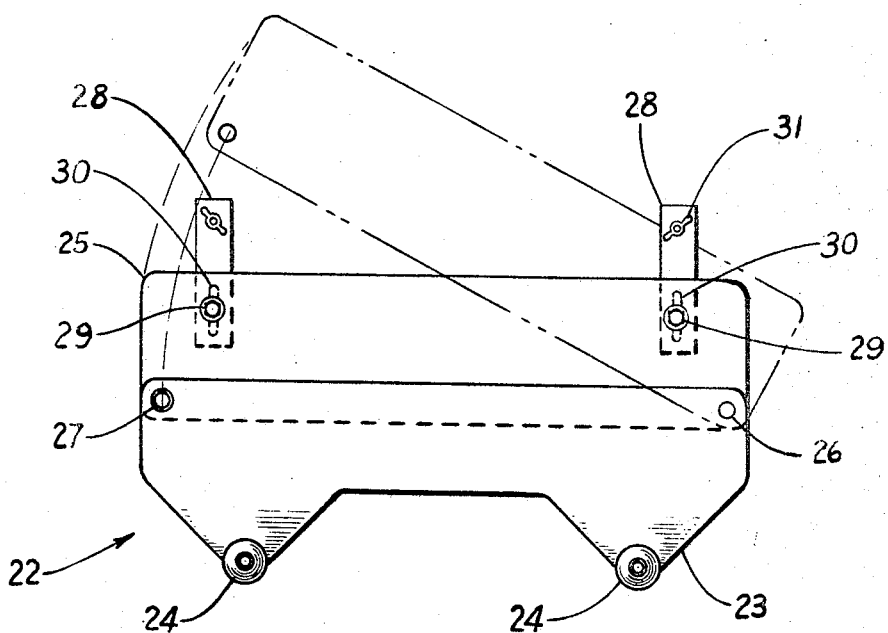
FIG. 4 shows a carriage assembly and illustrates with broken lines how the swing bar can be pivoted.
Figure 5:
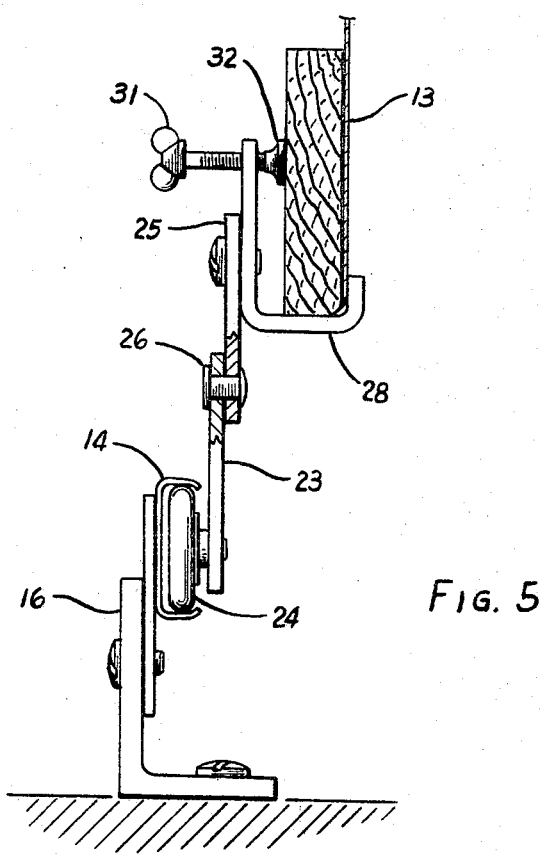
FIG. 5 is a partial sectional view showing how the boat is carried by the carriage assemblies.

A carriage assembly 22 has a frame member 23 and wheels 24 which are received in and rollable in the channel of track 14. A swing bar 25 is connected with frame 23 by a hinge pin 26 and is freely pivotable about hinge pin 26, another position being illustrated by broken lines in FIG. 4. A spring loaded detent pin 27 is provided to engage frame 23 and swing bar 25 and hold them securely together in the closed or carrying position shown in FIG. 4. Detent pin 27 is attached to frame 23 by a chain (not shown) to prevent its loss. Brackets 28 are attached to swing bar 25 by bolts 29. Slots 30 permit adjustment of brackets 28 with respect to swing bar 25. Brackets 28 are of a U-shaped or modified U-shaped form in order that the boat transom will lie in the groove. Thumb screws 31 having swivel pads 32 on their ends are threaded into brackets 28. When thumb screws 31 are tightened, swivel pads 32 adjust to the contour of the boat and press firmly against the boat to hold it in position in brackets 28. Different types and sizes of brackets can be used in order to accommodate different types, sizes and shapes of boats or other objects.

Figure 6:
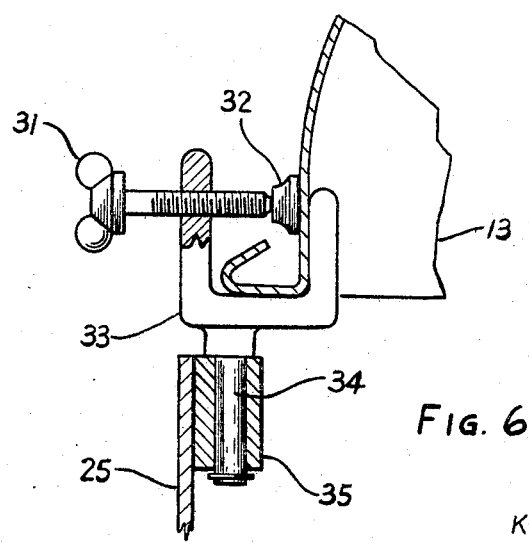
FIG. 6 shows another form of bracket.

A similar carriage assembly is carried in track 14. However, since boats are often of somewhat streamlined shape, the brackets at the forward end should be permitted to swivel in order to adjust to the contour of the boat. Swiveling may be achieved by using a modified Y-shaped bracket 33 with its leg 34 rotatably received in a tubular member 35 (FIG. 6). Tubular member 35 is secured to swing bar 25.

Figure 3:
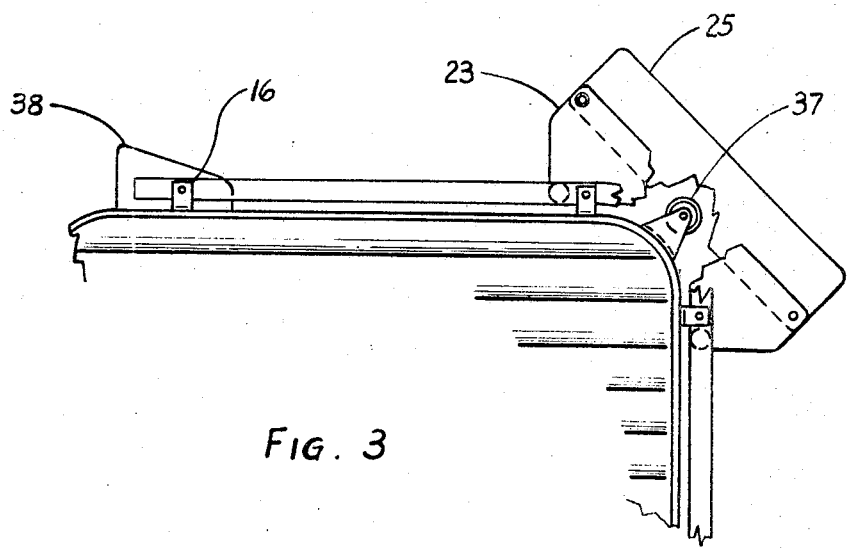
FIG. 3 is a partial sectional view of a track and carriage assembly.

As will be noted from FIG. 3, tracks 14 and 15 must be spaced sufficiently far away from the top and side surfaces of the camper 12 to permit the carriage assembly 22 to clear the corner formed by the top and side surfaces. The length of the carriage assembly 22 and the distance of the assembly above the wheels 24 determine the minimum spacing between the tracks and the camper. This spacing must also be sufficient to permit the carriage assembly to clear any protrusions from the camper or the truck.

When a boat is to be loaded onto the camper, the boat 13 is placed alongside the truck 11 as illustrated in FIG. 2. Both carriage assemblies 22 are brought down to the bottom of their respective tracks, 14 and 15. Swing bars 25 are swung over the top of the boat 13 and the boat is secured in brackets 28 and 33 by thumb screws 31. A roller assembly 37 is attached to the camper 12 adjacent the side and top of the camper. When cable 20 extends over the side of camper 12, roller assembly 37 will accommodate and guide cable 20 and prevent it from contacting the camper. Cable 20 is placed on roller assembly 37 and its free end is attached to boat 13 near its center, as at 21.

The winch 19 is then employed to lift the boat, and attached swing bars 25, into a vertical position. Swing bars 25 are then secured to frames 23 by detent pins 27. Winch 19 then causes the boat to ride up the track along with carriage assemblies 22 to which it is connected. When the boat and carriage assemblies are approximately in their uppermost or carrying position, a portion of boat 13 contacts a wedge-shaped block 38. Block 38 is made of rubber and is attached to the top of camper 12. Block 38 tapers at a slight angle away from the center of the camper. As boat 13 moves slightly up along the tapered surface of block 38, the boat will cant thus taking up the clearance or play in the hinge pin 26 and the detent pin 27. The boat 13 is thus firmly positioned and will not vibrate and rattle when truck 11 is moving.

To unload the boat, the loading procedure is reversed. A slight force may be required to move the boat off of block 38 and across the top of the camper, but this force is minimal since the boat and carriage assemblies 22 travel on wheels 24 in tracks 14 and 15.

While the foregoing description is presently considered to be a preferred embodiment of the invention, it is not intended to be all inclusive. Various changes and modifications may be made without departing from the scope and spirit of the invention.

The invention claimed is:

1. Apparatus for loading a boat onto and unloading the boat from the top of a recreational vehicle or the like, comprising a pair of tracks extending from adjacent the bottom of the vehicle onto the top of the vehicle and substantially thereacross, said tracks being secured to said vehicle, a carriage assembly for each track, said assembly including a frame with wheels, the wheels being receivable in and movable along said tracks, a swing bar for each frame, said bar and said frame being pivotally connected adjacent one of their respective ends to permit each bar to swing freely around the pivotal connection to an inverted position, means for detachably connecting the other end of each swing bar to the other end of said frame, support members attached to said swing bars for clamping reception of the gunwale of a boat, boat-lifting and lowering means secured to said recreational vehicle, and a pull line connecting said boat and said lifting and lowering means for moving the boat and carriage assembly along the full extent of said tracks.

2. Apparatus according to claim 1 wherein the support members consist of brackets having grooves formed therein for reception of the gunwale of the boat, said brackets including means for clampingly engaging said gunwale.

3. Apparatus according to claim 1 wherein the support members consist of brackets having grooves formed therein for reception of the gunwale of the boat, at least one of said brackets having a swivelling association with said swing bar and including means for clampingly engaging said gunwale.

4. Apparatus according to claim 1 with the addition of a wedge-shaped block attached to the top of the vehicle and in such a position as to contact a portion of the boat when the boat is adjacent the upper end of said track.

References Cited
UNITED STATES PATENTS

| | | | |
|---|---|---|---|
| 1,780,064 | 10/1930 | Buzzo | 214—75 |
| 1,920,243 | 8/1933 | Casper | 214—75 |
| 2,715,974 | 8/1955 | Van Nest | 214—450 |
| 2,849,135 | 8/1958 | Embler | 214—450 |
| 2,896,804 | 7/1959 | Ingram | 214—450 |
| 2,946,397 | 7/1960 | Berberich | 214—450 X |

HUGO O. SCHULZ, Primary Examiner